US005793950A

United States Patent [19]
Suzuki et al.

[11] Patent Number: 5,793,950
[45] Date of Patent: Aug. 11, 1998

[54] DEVICE CONTROL APPARATUS

[75] Inventors: Takashi Suzuki; Kumi Kanbara, both of Tokyo, Japan

[73] Assignee: Matsushita Electric Industrial Co., Ltd., Japan

[21] Appl. No.: 593,473

[22] Filed: Jan. 29, 1996

Related U.S. Application Data

[63] Continuation of Ser. No. 264,681, Jun. 23, 1994, abandoned.

[30] Foreign Application Priority Data

Jun. 23, 1993 [JP] Japan ................................. 5-151795

[51] Int. Cl.[6] ........................................... G06F 11/00
[52] U.S. Cl. ............................................... 395/185.1
[58] Field of Search ........................... 395/185.01, 185.1, 395/182.14; 371/3; 364/266.5, 946.1; 370/229, 242; 358/400, 442

[56] References Cited

U.S. PATENT DOCUMENTS

| 3,787,818 | 1/1974 | Arnold et al. ................. 340/172.5 |
| 3,794,973 | 2/1974 | Huber et al. .................. 340/146.1 |
| 4,054,949 | 10/1977 | Takezoe ............................ 364/900 |
| 4,149,142 | 4/1979 | Kageyama et al. ............ 340/146.1 |
| 4,270,202 | 5/1981 | Stuttard et al. ..................... 370/80 |
| 4,409,656 | 10/1983 | Andersen et al. ................ 364/200 |
| 4,760,488 | 7/1988 | Kishimoto .......................... 361/67 |
| 4,914,574 | 4/1990 | Terada et al. ...................... 364/200 |
| 5,031,179 | 7/1991 | Yoshida et al. .................... 371/32 |
| 5,127,013 | 6/1992 | Yoshida ............................... 371/32 |
| 5,231,663 | 7/1993 | Earl et al. ............................ 380/18 |
| 5,287,199 | 2/1994 | Zoccolillo ......................... 358/402 |
| 5,300,980 | 4/1994 | Maekawa et al. ................ 355/204 |
| 5,347,346 | 9/1994 | Shimizu et al. .................. 355/202 |
| 5,423,025 | 6/1995 | Goldman et al. ................ 395/575 |

OTHER PUBLICATIONS

Starkson, R., "A Triaxial Bus Transmission System", IEEE, pp. 82-85, 1979.

Primary Examiner—Robert W. Beausoliel, Jr.
Assistant Examiner—Stephen C. Elmore
Attorney, Agent, or Firm—Rossi & Associates

[57] ABSTRACT

A device controlling apparatus including a plurality of access points, each controlling receiving and sending of data in response to receiving demand and sending demand signals having an error detector for detecting an error during the receiving and the sending data; and an intercommunication portion for inter-communicating among the plurality of access points in response to the input output command from the error detector of one of the plurality of the access points, wherein the error detector of one of the access points informs other access points through the intercommunication portion of the error detected by the error detector using the input output command. Further, a priority setting portion is provided for setting a predetermined priority order to the plurality of access points in response to the receiving demand and sending demand signals; and a control portion responsive to receiving demand and sending demand signals for producing the control signal in accordance with the predetermined priority order may be provided.

4 Claims, 15 Drawing Sheets

DEVICE CONTROL APPARATUS

This is a Continuation of application Ser. No. 08/264,681 filed Jun. 23, 1994, now abandoned.

BACKGROUND OF THE INVENTION

1. Field of the Invention

The invention relates in general to a device control apparatus having a plurality of access points.

2. Description of the Prior Art

A device control apparatus having a plurality of access points for receiving and sending data in response to a demand is known. A prior art device control apparatus employs a control method of a data modem apparatus with the operating system Sun OS Version 4 from Sun Soft Corporation, U.S.A. FIG. 13 is a block diagram of the prior art device control apparatus. FIG. 14 shows a flow chart showing an operation of the prior art device control apparatus.

In FIG. 13, numeral 71 is a public telephone network, numeral 72 is a data modem apparatus connected to the public telephone network 71, numeral 73 is a host computer, and numeral 74 is an RS 232C cable for coupling the data modem apparatus to the host computer 73. Numeral 75 is a communication port circuit for controlling an RS 232C interface. Numeral 76 is a communication port control portion for controlling the communication port circuit 75 coupled to two access points. One access point is a receiving access point 77 provided by a ttyd device file and the other access point is a transmitting access point 78 provided by a cua device file. Numeral 79 is a log-in control portion 79 for controlling a log-in through the receiving access point 77. Numeral 80 is a terminal emulation portion for making a telephone call and a connection to a remote computer through the public telephone network 71 using the transmitting access point 78. The host computer 73 executes respective processings as respective blocks shown in FIG. 13 in cooperation with an operation system 70 provided for the host computer 73.

An open process by the device control apparatus as mentioned above will be described with reference to FIG. 14. The open process is executed by the host computer 73 when the log-in control portion 79 opens the ttyd device file (receiving access point) 77 and sends an open processing demand to the communication port control portion 76 or the terminal emulation portion 80 opens the cua device file (transmitting access point) 78 and sends an open process demand to the communication port control portion 76. The log-in control portion 79 opens the ttyd device file 77 on start-up. When the communication port control portion 76 receives the open process demand (step 81), the communication port control portion 76 waits until two conditions are satisfied (step 85). One condition is that the data modem apparatus 72 receives a call from the public telephone network 71 and the data modem apparatus 71 has been connected (step 82). The second condition is that the cua device file 78 is not opened (step 83). When these conditions are satisfied, a preparing process for preparing the data modem apparatus 72 for start of use is executed by the host computer 73 as the operation of the communication control portion 76 (step 84). When this preparing process ends, the log-in control portion 79 receives a log-in name or a pass word or the like from the remote computer and provides a session service including a diagnostic service. When the session service ends, the log-in control portion 79 sends a close process demand of the ttyd device file 77 to the communication port control portion 76. When the communication port control portion 76 receives the close process demand, the communication control portion 76 executes a close process to close the data modem apparatus 72.

The terminal emulation portion 80 is activated by a user or a remote computer (not shown) and then sends an open process demand for the cua device file 78 to the communication control portion 76. When the communication control portion 76 receives the open process demand for the cua device file 78 (step 86), it confirms whether the data modem apparatus 72 has been connected (step 87). If the data modem apparatus 72 has not been connected, the communication control portion 76 executes a preparing process for preparing the data modem apparatus 72 for start of use (step 88). If the data modem apparatus has been connected, the communication control portion 76 sends an error code indicating that the data modem apparatus 72 is busy to the terminal emulation portion 80 (step 89). If there is neither the open process demand for the ttyd device file 77 nor the open process demand for the cua device file 78, another error code, the communication control portion 76 sends another error code indicative of an error access of the access points to the log-in control portion 79 and the terminal emulation portion 80 and ends the processing (step 90).

When the terminal emulation portion 80 finishes the open processing of the cua device file 78, it sends a command to the data modem apparatus 72 in order to connect the data modem apparatus to the remote computer. When the communication ends, the terminal emulation portion 80 executes a close process of the cua device file 78. When the communication port control portion 76 receives a close process demand for the cua device file 78, it executes the close process to disconnect the data modem 72.

As mentioned above, a right of the data modem apparatus 72 is provided to the access point which has completed the open processing and when the close processing is executed the right is released.

An error processing will now be described. When the log-in control portion 79 receives the error code from the data modem apparatus 72 during use of the ttyd device file 77, the log-in control portion 79 executes an internal error processing but it does not inform the terminal emulation portion 80 of the error. On the other hand, when the terminal emulation portion 80 receives the error code from the data modem apparatus 72 during use of the cua device file 78, the terminal emulation portion SO executes an internal error processing but it does not inform the log-in control portion 79 of the error.

SUMMARY OF THE INVENTION

The present invention has been developed in order to remove the above-described drawbacks inherent to the conventional device controlling apparatus.

According to the present invention there is provided a device controlling apparatus comprising: a plurality of access points, each controlling receiving and sending of data in response to receiving demand and sending demand signals having: an error detector for detecting an error during the receiving and the sending of data; and an intercommunication portion for intercommunicating among the plurality of access points in response to the input output command from the error detector of one of the plurality of the access points, wherein the error detector of one of the access points informs other access points through the intercommunication portion of the error detected by the error detector using the input output command.

According to the present invention there is also provided a device controlling apparatus comprising: a plurality of access points, each controlling receiving and sending of data in response to a control signal; a priority setting portion for setting a predetermined priority order to the plurality of access points in response to the receiving demand and sending demand signals; and a control portion responsive to receiving demand and sending demand signals for producing the control signal in accordance with the predetermined priority order.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1:
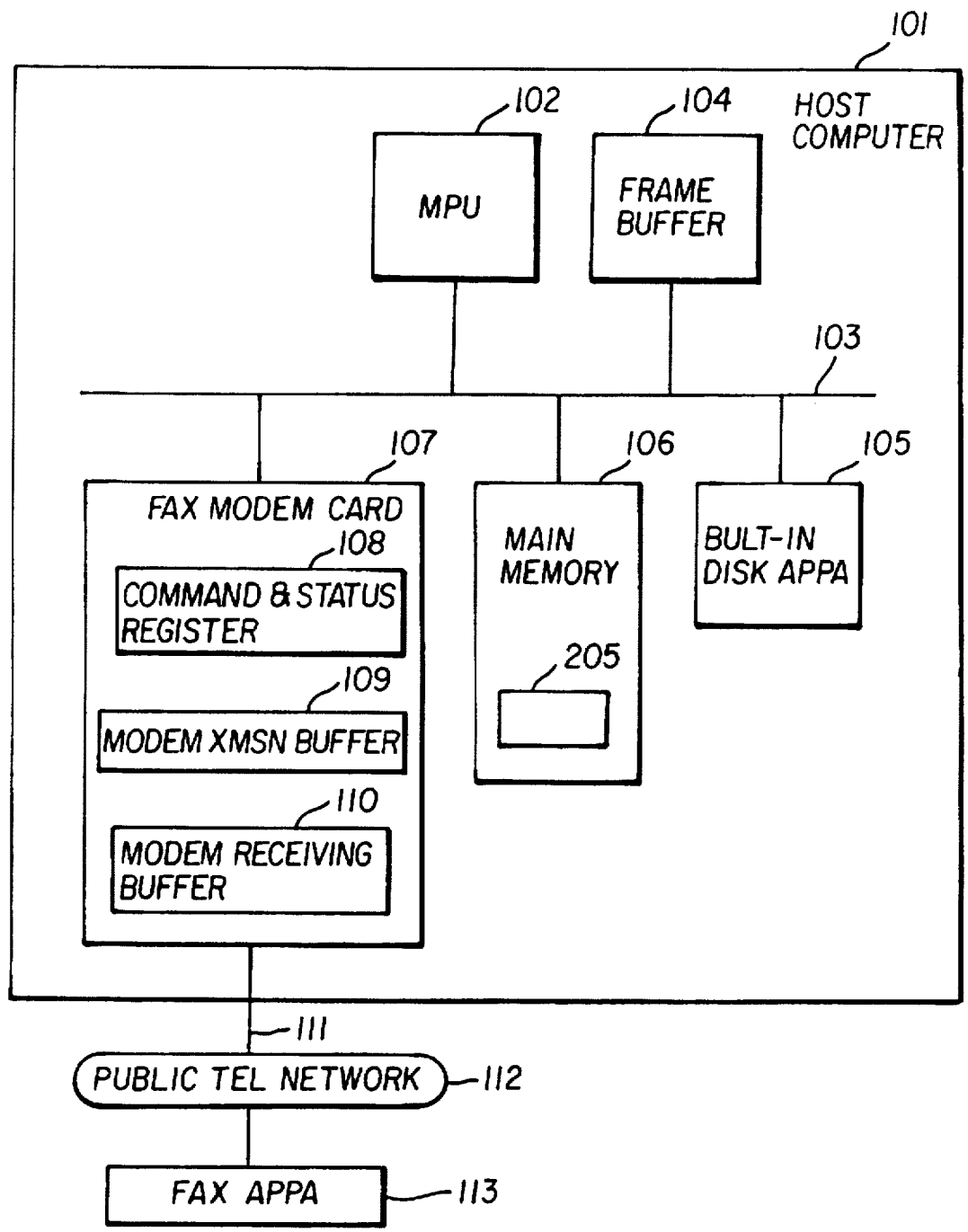
FIG. 1 is a block diagram of this embodiment of this invention for showing a computer facsimile apparatus using a device control apparatus.

FIG. 1 is a block diagram of this embodiment of this invention for showing a computer facsimile apparatus using a device control apparatus.

In FIG. 1, numeral 101 is a host computer, numeral 102 is a microprocessor (MPU), and numeral 103 is an internal bus including data signal lines, address signal lines, and interruption signal lines. Numeral 104 is a frame buffer memory for storing image information for a display unit, numeral 105 is a built-in hard disc apparatus, numeral 106 is a main memory, and numeral 107 is a facsimile (FAX) modem card (card) connected to the internal bus 103. The facsimile modem card 107 has a command and status register 108 including a command portion and status portion. The command portion comprises bits indicative of start of operation, stop of operation, and an interruption command. The MPU 102 can command the facsimile modem card 107 to effect the start of operation, stop of operation, and the interruption by writing to the register 108. The status portion of the register 108 has an ACK bit and a data bit. When the MPU 102 is subjected to an interruption from the facsimile modem card 107, the MPU 102 can determine the cause of the interruption by reading the register 108. That is, if the ACK bit is on, it indicates the interruption for informing an acknowledgement of reception of data transmitted from the host computer 101 to the facsimile modem card 107. If the data bit is on, it indicates an interruption informing of the presence of readable data on the facsimile modem card 107. The facsimile modem card 107 further comprises a modem transmission buffer 109 for storing a transmission data transferred from the host computer 101, and a modem receiving buffer 110 for storing data to be transferred to the host computer 101. The facsimile modem card 107 is connected to a public telephone network 112 through a modular cable 111 to communicate with a remote general facsimile apparatus 113.

Figure 2:
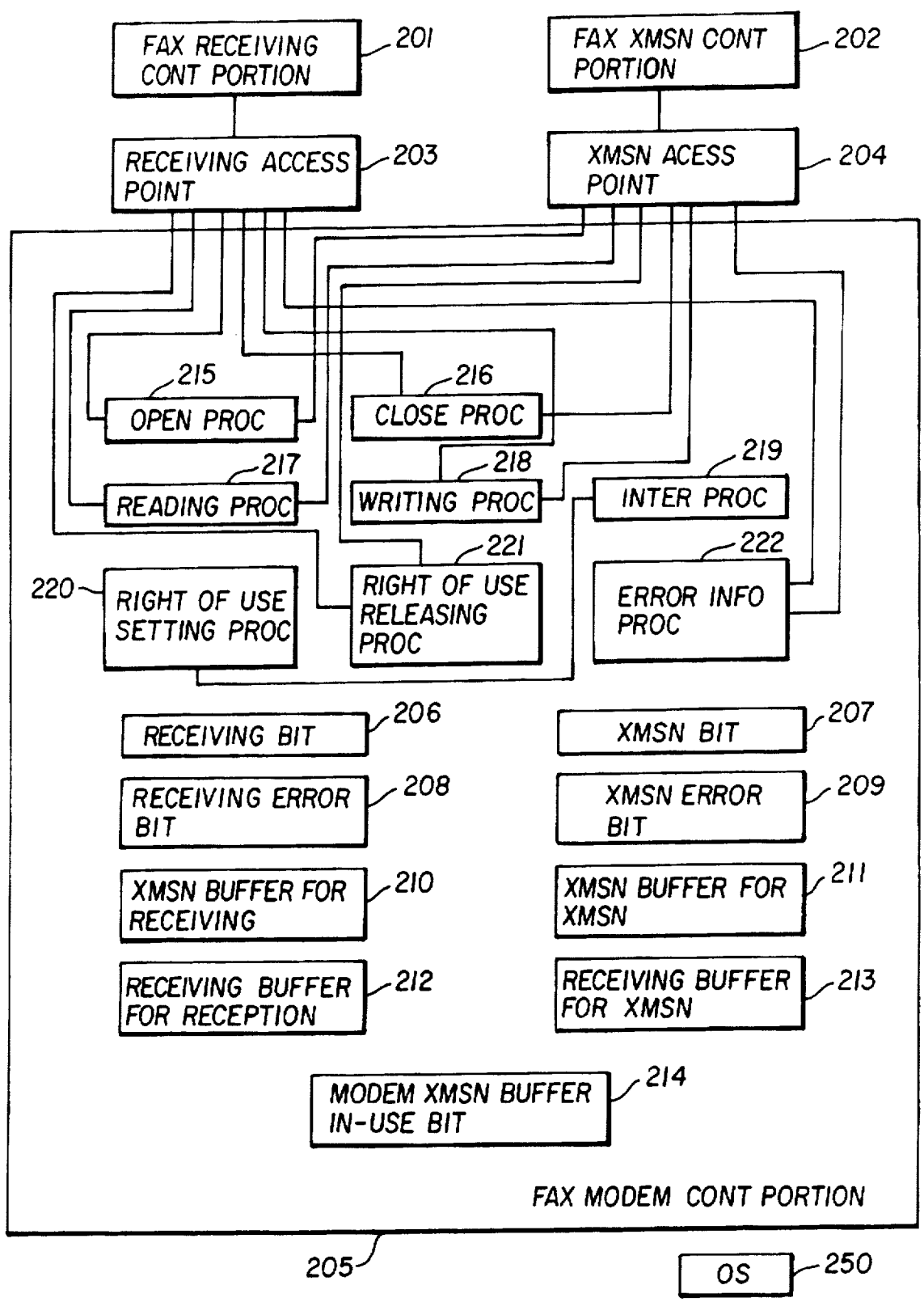
FIG. 2 shows a software structure of this embodiment of the facsimile apparatus.

FIG. 2 shows a software structure of this embodiment of the facsimile apparatus. A facsimile receiving control portion 201 is a program for controlling the function of initial setting, detection of a call, facsimile receiving control after reception of a call of the facsimile modem card 107 and is activated at the start-up of the system and operates until the operation stops. A facsimile transmission control portion 202 is a program for controlling the transmission of facsimile image file through a transmission access point 204 and is activated when a user transmits a facsimile image file and finishes its operation when the transmission is terminated. Here, the term "access point" (AP) is a logical name of a computer device control apparatus and is used by a program controlling a device and is generally related to a device control software (device driver) by an operating system (OS) 250 of the host computer 101. In this invention, a facsimile modem control portion 205 is a device driver for the facsimile modem card 107 and is related to the two access points, namely, a receiving access point 203 and a transmission access point 204 by the operation system 250 of the host computer 101. The receiving access point 203 has a priority higher than the transmission access point 204 as mentioned later.

The facsimile modem control portion 205 has a receiving bit 206, a transmission bit 207, a receiving error bit 208, a transmission error bit 209, a transmission buffer for receiving 210, a transmission buffer for transmission 211, a receiving buffer for reception 212, a receiving buffer for transmission 213, and a modem transmission buffer in-use bit 214.

"ON" of the receiving bit 206 indicates that a right of use of the facsimile modem card 107 exists in the receiving access point 203 and "OFF" indicated that the right of use of the facsimile modem card 107 is absent in the receiving access point 203.

"ON" of the transmission bit 207 indicates that a right of use of the facsimile modem card 107 exists in the transmission access point 204 and "OFF" indicated that the right of use of the facsimile modem card 107 is absent in the transmission access point 204. Here, the receiving bit 206 and the transmission bit 207 are set to OFF at the initializing of the facsimile modem control portion 205 and neither of them becomes ON at the same time.

"ON" of the receiving error bit 208 indicates that an error in the facsimile modem card 107 during an operation of receiving and "OFF" means that the facsimile modem card 107 is in a normal condition. The error detection operation will be described later. "ON" of the transmission error bit 209 indicates that an error in the facsimile modem card 107 during an operation of transmission and "OFF" means that the facsimile modem card 107 is in a normal condition. Here, both of the receiving error bit 208 and the transmission error bit 209 are set to OFF at the initializing of the facsimile modem control portion 205.

A transmission buffer for receiving 210 and a transmission buffer for transmission 211 store transmission data from the facsimile receiving control portion 201 and transmission data from the facsimile transmission control portion 202 respectively. The receiving buffer for reception 212 and the receiving buffer for transmission 213 store receiving data from the modem receiving buffer 110 to the facsimile receiving control portion 201 and receiving data from the modem receiving buffer 110 to the facsimile transmission control portion 202 respectively.

The modem transmission buffer in-use bit 215 indicates that the modem transmission buffer 109 is busy when it is "ON", which condition indicates that data transmission to the modem transmission buffer is not allowed at that instance. "OFF" of the modem transmission buffer in-use bit 215 means an idle state and indicates that the modem transmission buffer 109 is ready, which condition indicates that data transmission to the modem transmission buffer is allowed at that instance.

Processing of the facsimile modem control portion 205 will now be described. Numeral 215 is an open process which is a preparing process for using the facsimile modem card 107. Numeral 216 is a close process which is a termination process of using the facsimile modem card 107. Numeral 217 is a reading process for reading of data from the facsimile modem card 107. Numeral 218 is a writing process for writing data on the facsimile modem card 107. Numeral 219 is an interruption process for effecting an interruption from the facsimile modem card 107 to the MPU 102 to effect data transmission between: the modem transmission buffer 109 and modem receiving buffer 110 of the facsimile modem card 107; and receiving buffer for reception 212 and the receiving buffer for transmission 213 of the facsimile modem control portion 205. Numeral 220 is a right of use setting process for providing a right of use to the receiving access point 203 having a higher priority. Numeral 221 is a right of use releasing process for removing the right of use from the receiving access point 203 having the higher priority order. Numeral 222 is an error information process. When an IO error is detected at one access point, the error information process 222 informs the other access point of the IO error.

Figure 3:
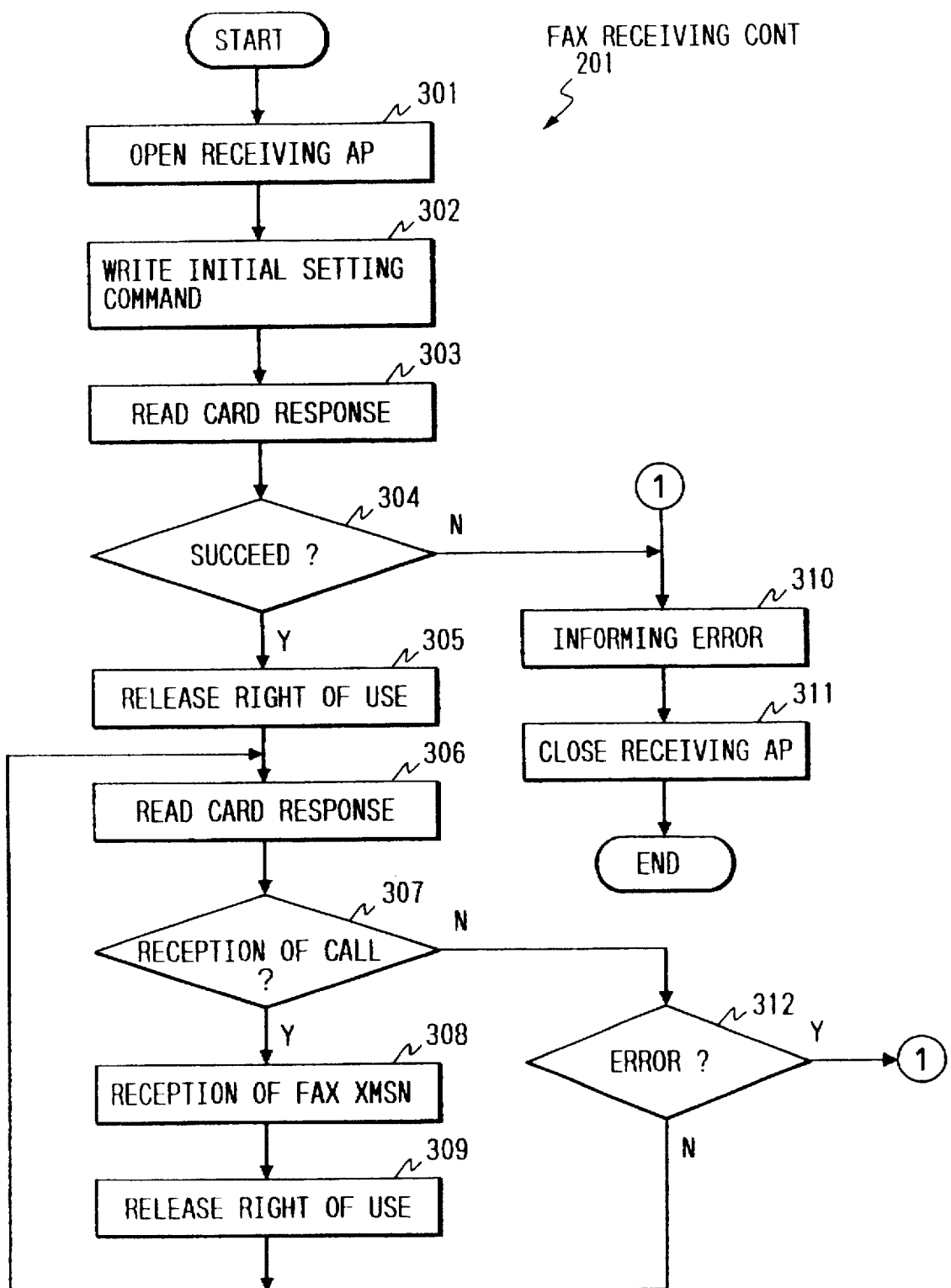
FIG. 3 shows a flow chart of this embodiment for showing an operation of the facsimile receiving control portion shown in FIG. 2.
Figure 5:
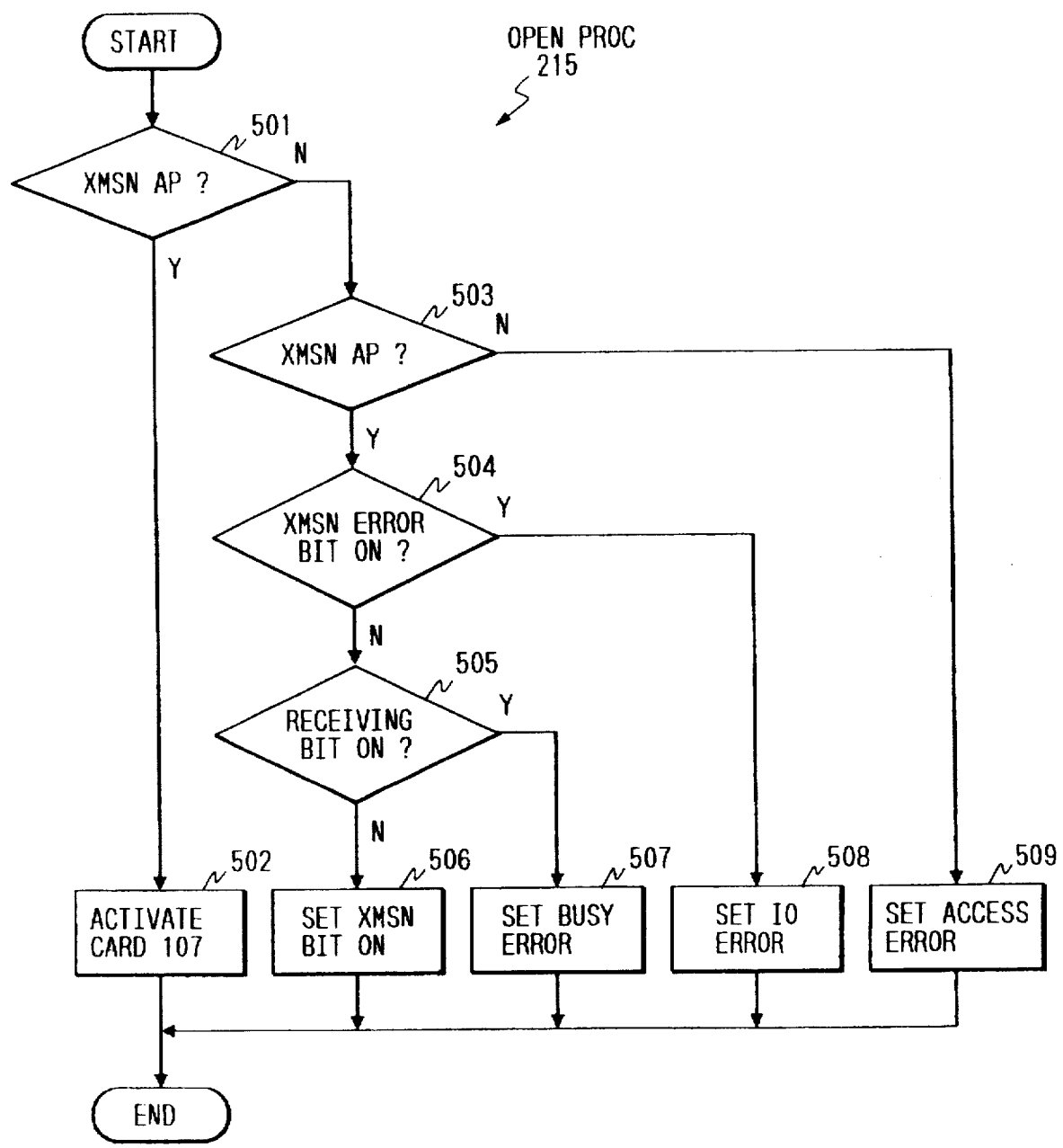
FIG. 5 shows a flow chart of this embodiment for showing an operation of the open processing shown in FIG. 2.

Hereinbelow will be described an operation of this embodiment with reference to drawings. FIG. 3 shows a flow chart of this embodiment for showing an operation of the facsimile receiving control portion 210 shown in FIG. 2. In step 301, the facsimile receiving control portion 201 sends an open system call for starting the reception controlling of the facsimile modem card (CARD) 107 to the receiving access point (AP) 203. At this instance, the operation system of the host computer 101 calls (activates) the open process of the facsimile modem control portion 205 with sending a parameter indicative of a type of the access point to the open process. FIG. 5 shows a flow chart of this embodiment for showing an operation of the open process 215 shown in FIG. 2. In FIG. 5, a decision is made as to whether this process is for the receiving access point 203 in step 501. If the answer is YES, in step 502, the facsimile modem card 107 is activated. An activation bit of the command and status register 108 is set to ON. If this open process is for the transmission access point 204, the answer in the step 503 is YES and a decision is made as to whether or not the transmission error bit 209 is ON in step 504. If there is no error, a decision is made as to whether or not the receiving access point has the right of use in step 505. If the answer is YES, a busy error is set in step 507 and ends this process. If the answer in step 505 is NO, the right of use of the transmission access point 204 is set in step 506 and ends this process. The checking of the present of the right of use and its setting processing in the open process for the receiving access point are unnecessary. This reason will be described later.

Figure 8:
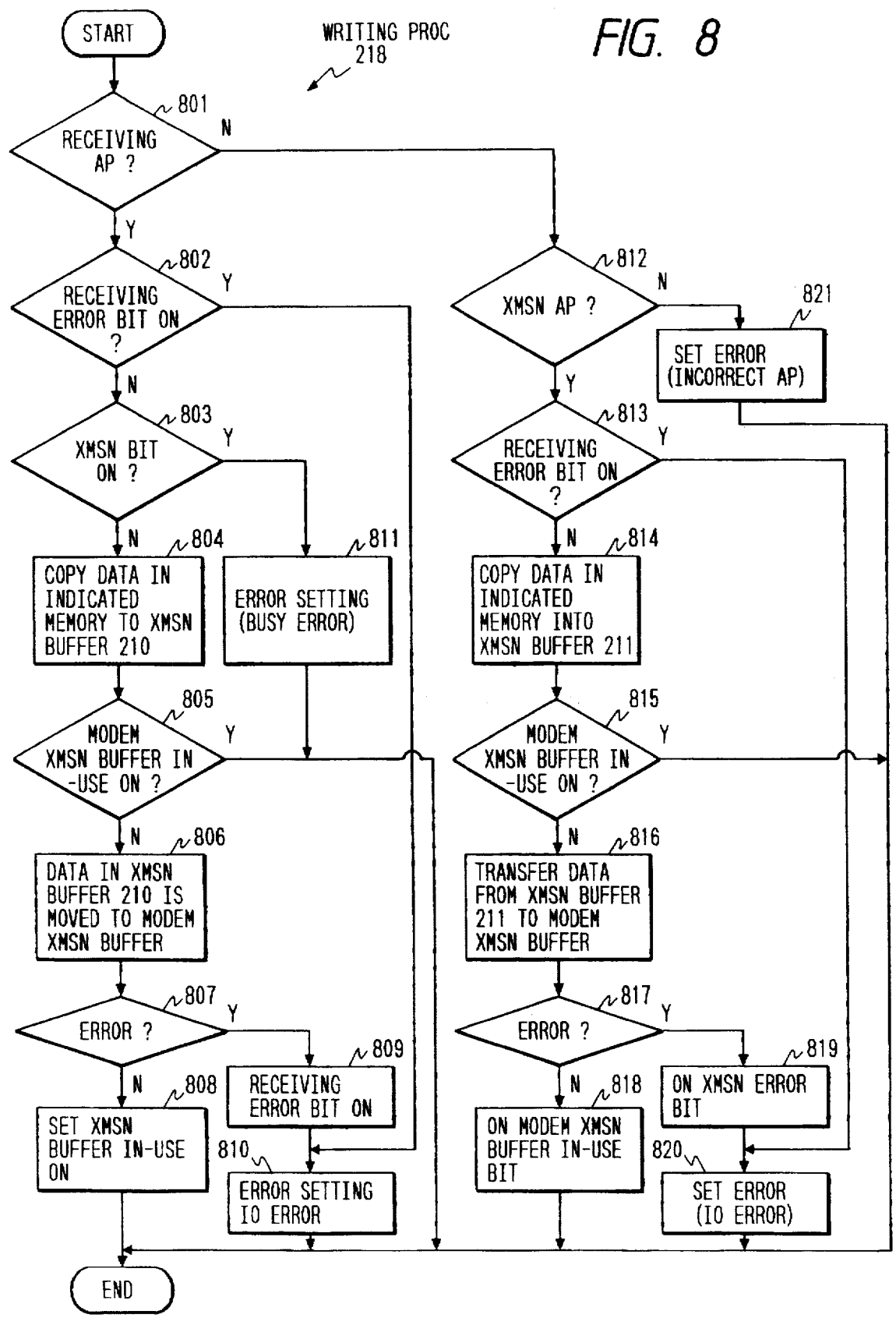
FIG. 8 shows a flow chart of this embodiment for showing an operation of the writing processing shown in FIG. 2.

Then, the facsimile receiving control portion 201 sends an initial setting command to the facsimile modem card 107 by writing system call. Then, the operating system of the host computer 101 calls (activate) the writing process 218 of the facsimile mode control portion 205 with informing of parameters indicative of a type of the access point and an address of writing data. FIG. 8 shows a flow chart of this embodiment for showing an operation of the writing process 218 shown in FIG. 2. In FIG. 8, a decision is made to as whether or not this process is for the receiving access point 203 in step 801. If YES, in step 802, a decision is made as to whether or not the receiving error bit 208 is ON. IF YES, in step 810, an IO error is set and then, the open process is finished in step 810. If the error bit 208 is OFF, a decision is made as to whether the transmission bit 207 is ON. In the receiving access point 203, as mentioned earlier, the checking in step 803 is necessary because the setting of the right of use of the receiving access point has been not set in the open process in step 803. If the transmission bit is ON, the right of use exists in the transmission access point 204, that is, the facsimile transmission portion 202 uses the facsimile modem card 107. In step 811, a busy error is set in step 805 and the open process is finished. If the transmission bit is OFF, in step 804, data is copied into the transmission buffer for receiving 210. Then, in step 805, a decision is made as to whether or not the modem transmission buffer 109 is in use. If YES, the process ends. If NO, in step 806, the content of the buffer 210 is transferred to the modem buffer 109. At this instance, the MPU 102 sets the interruption bit of the command and status register 108 to ON to inform of reaching of the data. In step 807, a decision is made as to whether or not the transfer is succeeded. If YES, in step 808, the modem transmission buffer 109 is set to be in use, If NO, the receiving error bit is set to ON in step 809 because an error is detected. In the following step 810, an IO error is set and processing ends.

The writing process for the transmission access point is shown in steps from 812 to 821 which are similar to the writing process for the receiving access point. The difference is that it is unnecessary to check whether or not the receiving access point has the right of use because the transmission access point gets the right of use in the open process in step 506.

Figure 9A:
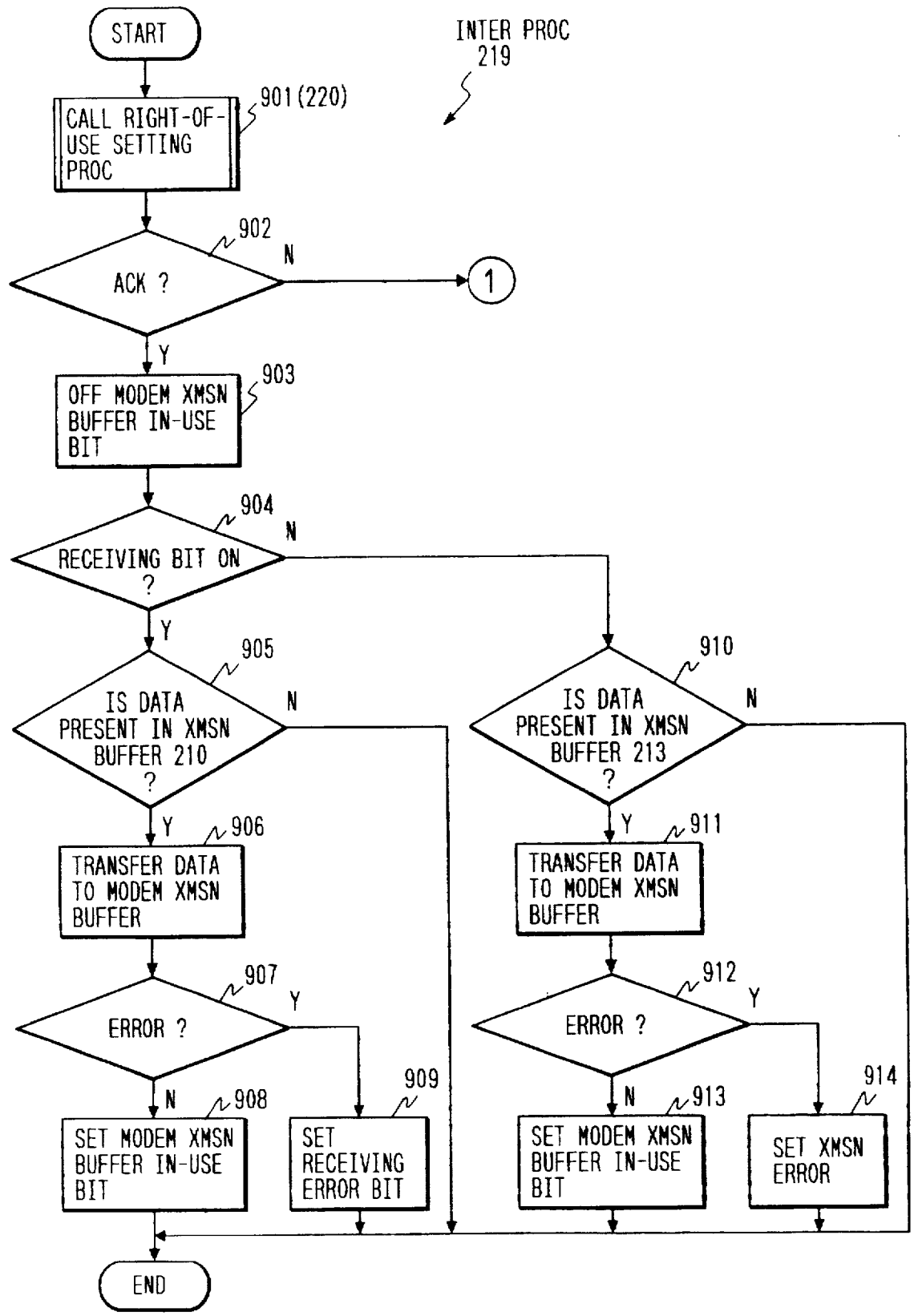
FIGS. 9A and 9B show a flow chart of this embodiment for showing the interruption processing shown in FIG. 2.
Figure 9B:
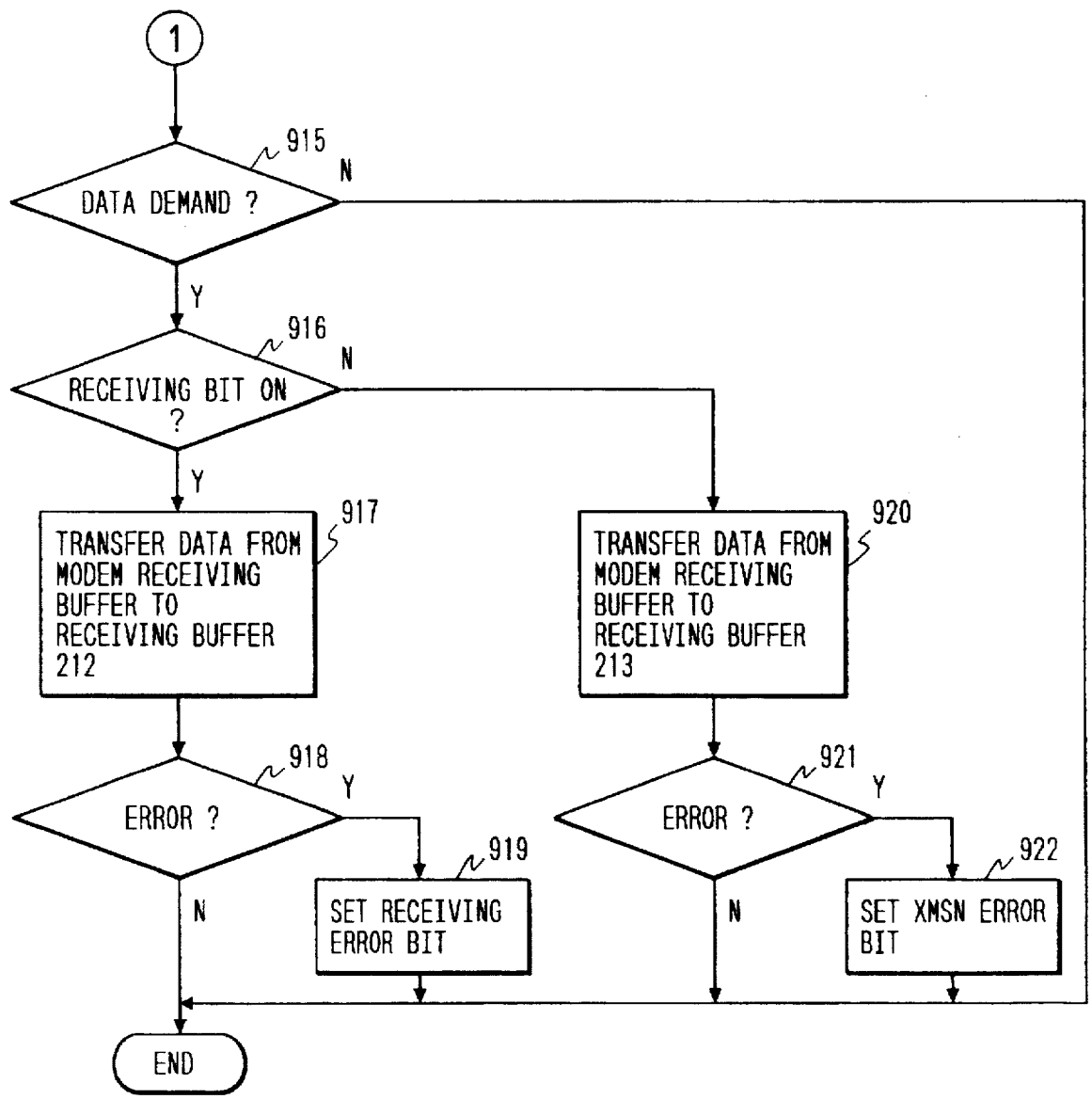
Figure 10:
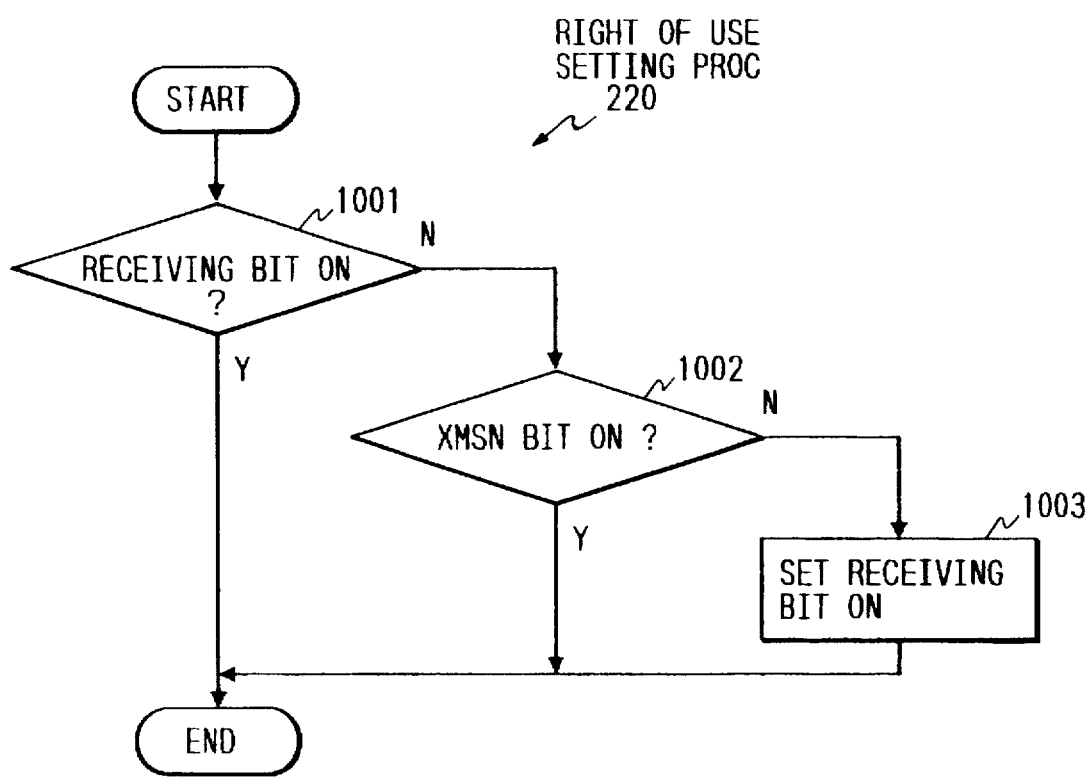
FIG. 10 shows a flow chart of the right of use setting processing shown in FIG. 2.

When the facsimile modem card 107 is interrupted by the MPU 102, it reads the content of the modem transmission buffer 109 and executes an interruption. When the modem transmission buffer becomes empty, the facsimile modem card 107 sets the ACK bit of the command and status register 108 to ON and interrupts the MPU 102 using the interruption signal line in the bus 103. When the MPU 102 is subjected to the interruption from the facsimile modem card 107, the operation system of the host computer 101 calls (activates) an interruption process 219 of the facsimile modem control portion 205. FIGS. 9A and 9B show a flow chart of this embodiment for showing the interruption process 219 shown in FIG. 2. At first, in step 901, the interruption process calls (activates) the right of use setting process 220. FIG. 10 shows a flow chart of the right of use setting process shown in FIG. 2. In FIG. 10, the right of use setting process makes a decision as to whether or not the receiving access point has the right of use in step 1001 and makes a decision as to whether the transmission access point has the right of use. If neither of these access points has the right of use, in step 803, the receiving bit is set to ON to provide the right of use to the receiving access point having a higher priority. As mentioned above, the facsimile modem card 107 responds to the command from the receiving control portion 201, the right of use is provided to the receiving access point automatically. Therefore, it is unnecessary that the open process 215 provides the right of use to the receiving access point 203.

The interruption process 219 checks whether or not the cause of the interruption is an acknowledgement of the transmission data. If YES, the interruption process 219 sets the modem transmission buffer in-use bit OFF. From step 904 to step 914, the processing checks whether or not is there further data to be transmitted to the modem. If there is further data, the transferring process is executed. That is, if the right of use exists in the receiving access point, the processing checks whether there is transmission data in step 905. If YES, in step 906, data is transferred from the transmission buffer for reception 210 to the modem transmission buffer 109. If the transfer has succeeded, in step 908, the processing sets the modem transmission buffer in-use bit ON. If the transfer has failed, processing sets the receiving error bit ON in step 090 because an error in the facsimile modem card 107 is detected. In the case that the transmission access point has the right of use, the similar processing from step 910 to step 914 is executed.

In the description mentioned above, the initial setting command written by the facsimile receiving control portion 201 is transferred to the facsimile modem card 107. In response to the reception of the command, the facsimile modem card 107 executes a processing indicated by the command, sets a response information to the modem receiving buffer 110, sets the data bit of the command and status register 108 ON, and interrupts the MPU 102 with the interruption signal line of the bus 103. In response to the interruption, the operation system of the host computer 101 calls the interruption process 219. The interruption process 219 checks whether or not the cause of the interruption is the data demand in step 915. If YES, the interruption process 219 transfers the content of the modem receiving buffer 110 to either of the receiving buffer 212 or 213 having the right of use from step 917 to 922. If an error is detected, the interruption process 219 sets the error bit ON in steps 919 and 922.

Figure 7:
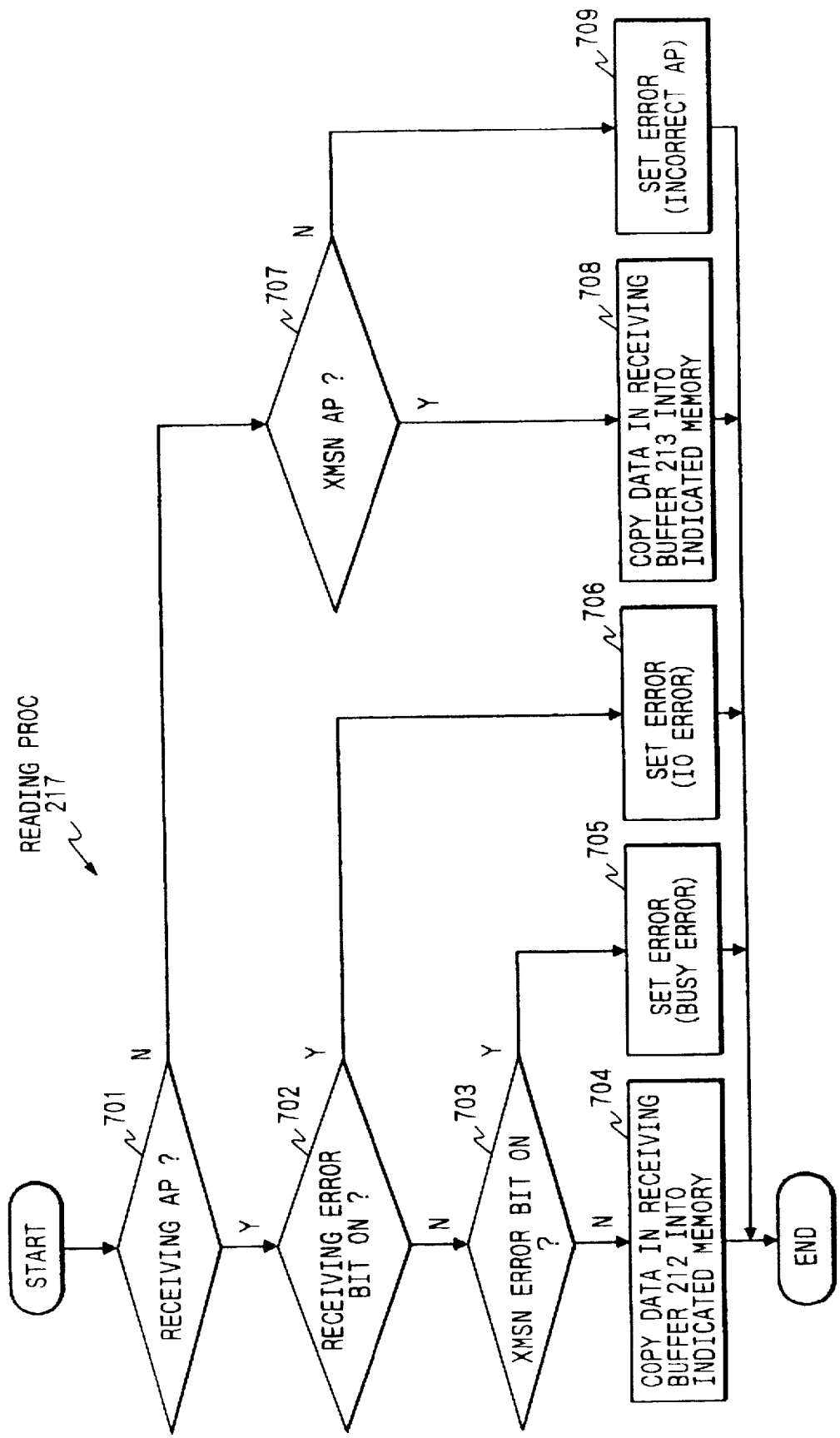
FIG. 7 shows a flow chart of this embodiment for showing the reading processing shown in FIG. 2.

The facsimile receiving control portion 201 supplies a reading system call to the receiving access point to obtain a response to the initial setting command in step 303. At the same time, the operation system of the host computer 101 calls the reading process 217 with parameters of the type of the access point, an address of a memory for storing the read data or the like. FIG. 7 shows a flow chart of this embodiment for showing the reading process 217 shown in FIG. 2.

In step 701, the reading process 217 checks whether the reading demand is for the receiving access point. If YES, it checks whether the error is detected in the facsimile modem card 107 in step 702. If the error occurs there, the reading process 217 sets the IO error in step 706 and finishes the process. If there is no error, the reading process 217 checks whether the right of use exists in the transmission side in step 703. If YES, the reading process sets the busy error and finishes the processing. If the error is not busy error, the reading process 217 copies data in the receiving buffer for reception 212 into the memory at the indicated address in step 704 and finishes the processing. If the reading in the step 303 is terminated, the facsimile receiving control portion 201 checks the result of execution of the initial setting command in step 304.

Figure 4:
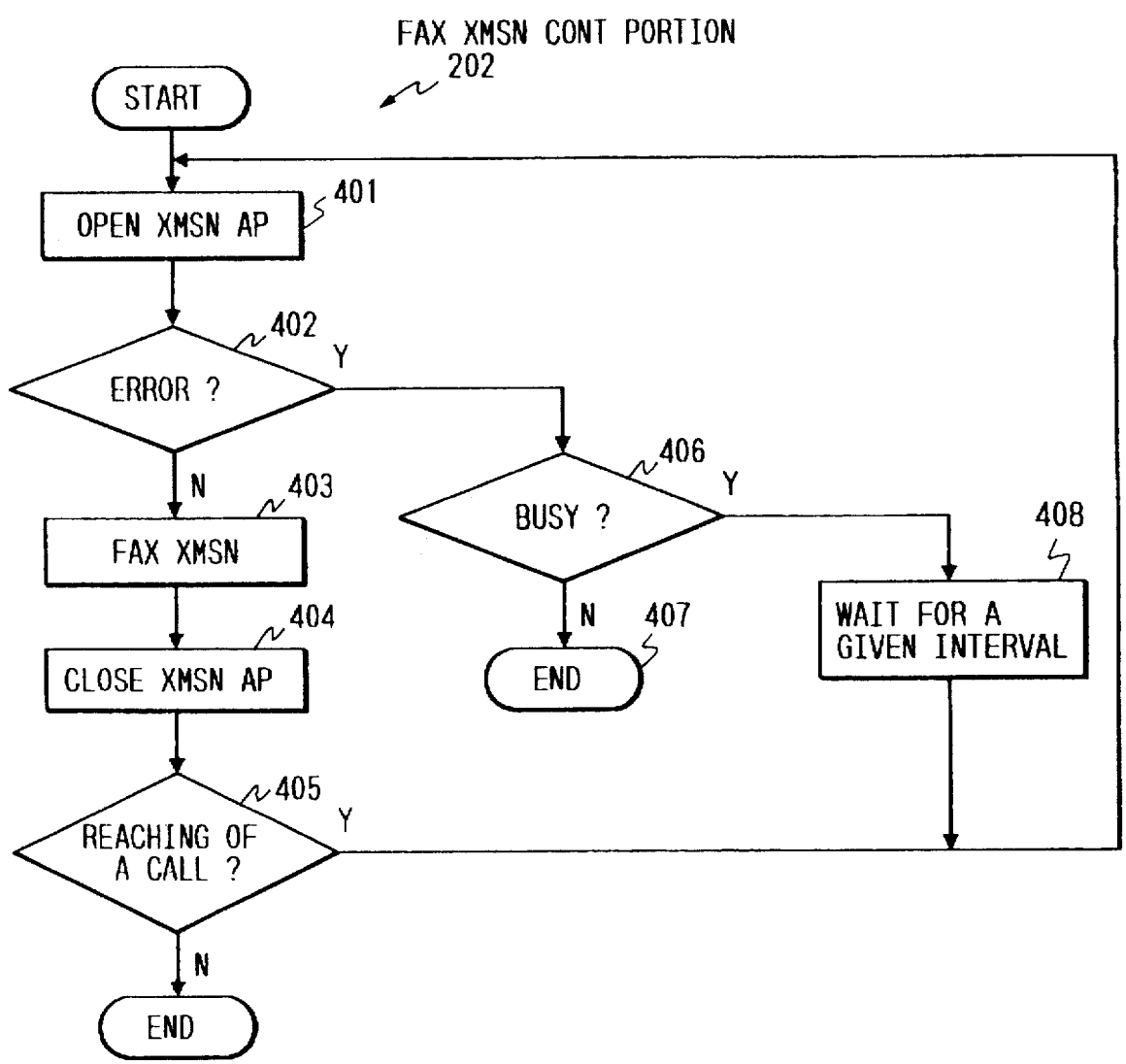
FIG. 4 shows a flow chart of this embodiment for showing the facsimile transmission control portion shown in FIG. 2.
Figure 11:
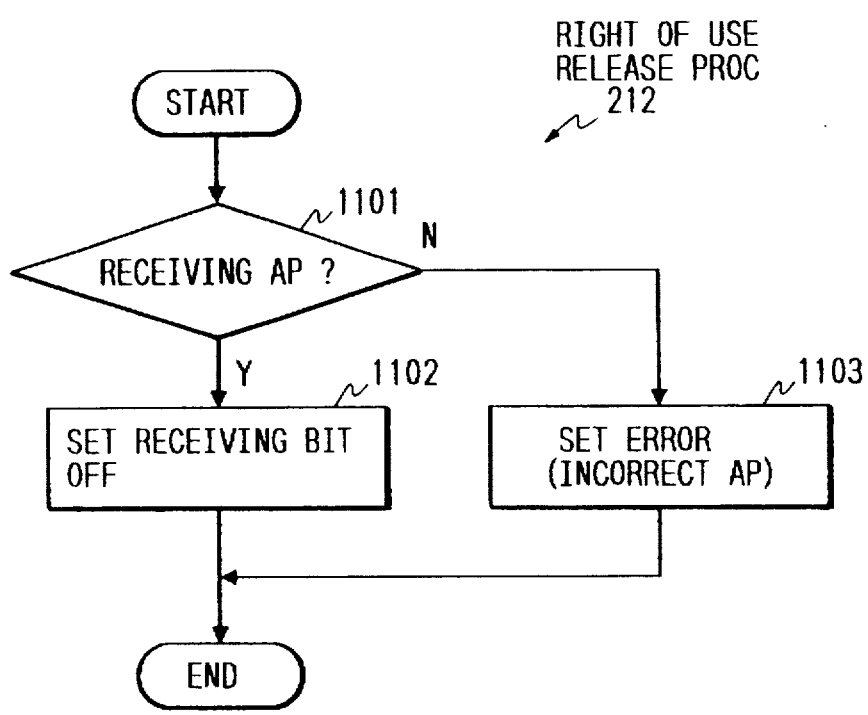
FIG. 11 shows a flow chart of this embodiment for showing the right of use release processing shown in FIG. 2.

If the execution is succeeded, the right of use release command is executed to remove the right of use from the receiving access point 203 and make it possible that the facsimile transmission control portion 202 can use the facsimile modem card 107 in step 305. This is executed using an input output control system call. The operation system of the host computer 101 calls the right of use release process 221 with the parameter indicative of the type of the access point. FIG. 11 shows a flow chart of this embodiment for showing the right of use release process 221 shown in FIG. 2. FIG. 4 shows a flow chart of this embodiment for showing the facsimile transmission control portion 202 shown in FIG. 2. The right of use release process 212 checks whether a type of the access point is of receiving in step 1101. If YES, the process sets the receiving bit OFF. If the receiving bit is OFF, it is possible to set the right of use of the facsimile modem card 107 for the transmission access point 204 in step 506 because the receiving bit becomes OFF when the facsimile transmission control portion 202 started up by the user of this facsimile apparatus opens the transmission access point 204 in step 401.

In step 1101, if the right of use release process is for other than the receiving access point, the processing sets an incorrect access point error and finishes the processing. Since the setting of the right of use has a lower priority order, it is not executed automatically, so that the right of use release process is unnecessary.

In step 306, the facsimile receiving control portion 201 supplies a read system call to the receiving access point 203 to wait a call from the public telephone network 112. At the same time, the operation system of the host computer 101 calls the reading process 217 with parameters indicative of the type of the access point, an address of a memory for storing the read data. If there is no error and the facsimile transmission control portion 202 does not use the facsimile modem card 107, a step 704 is executed. However, if data is absent in the receiving buffer for reception, the processing waits in the step 704. On the other hand, if there is a call from the public telephone network 112, the facsimile modem card 107 sets a receiving response to the modem receiving buffer 110, the data bit of the command and status register 103 ON, and interrupts the MPU 102 using the interruption signal line of the bus 103. In response to the interruption, the operation system of the host computer 101 calls the interruption process 219. In the step 901 of the interruption process 219, the right of use setting process is called. Here, if neither of access points has the right of use, the right of use is set to the receiving access point automatically as shown in FIG. 10. Then, in processing after step 917, the receiving response is copied from the modem receiving buffer 110 to the receiving buffer for reception 212 and then, the reading process which has been waiting is continued and the receiving response is read out at the facsimile receiving control portion 201, and the facsimile receiving process is called in step 308. In the facsimile receiving process, the command for controlling the facsimile communication is written for the receiving access point 203, and the command and video image data is read from the receiving access point 203. The read video image is written in the built-in disc apparatus 105. After termination of the facsimile receiving, in step 308, the right of use release command is executed to remove the right of use from the receiving access point 203 and processing returns to step 303 to wait the next call.

As mentioned above, the facsimile receiving control portion 201 can finish the open process before the reception of a call because when there is the interruption from the facsimile modem card 107, if the receiving access point has no right of use of the facsimile modem card 107, the right of use is set to the receiving access point having a higher priority automatically. Therefore, the receiving control portion 201 can execute the initial setting or the like before the reaching of a call, so that a flexible controlling is provided.

Figure 6:
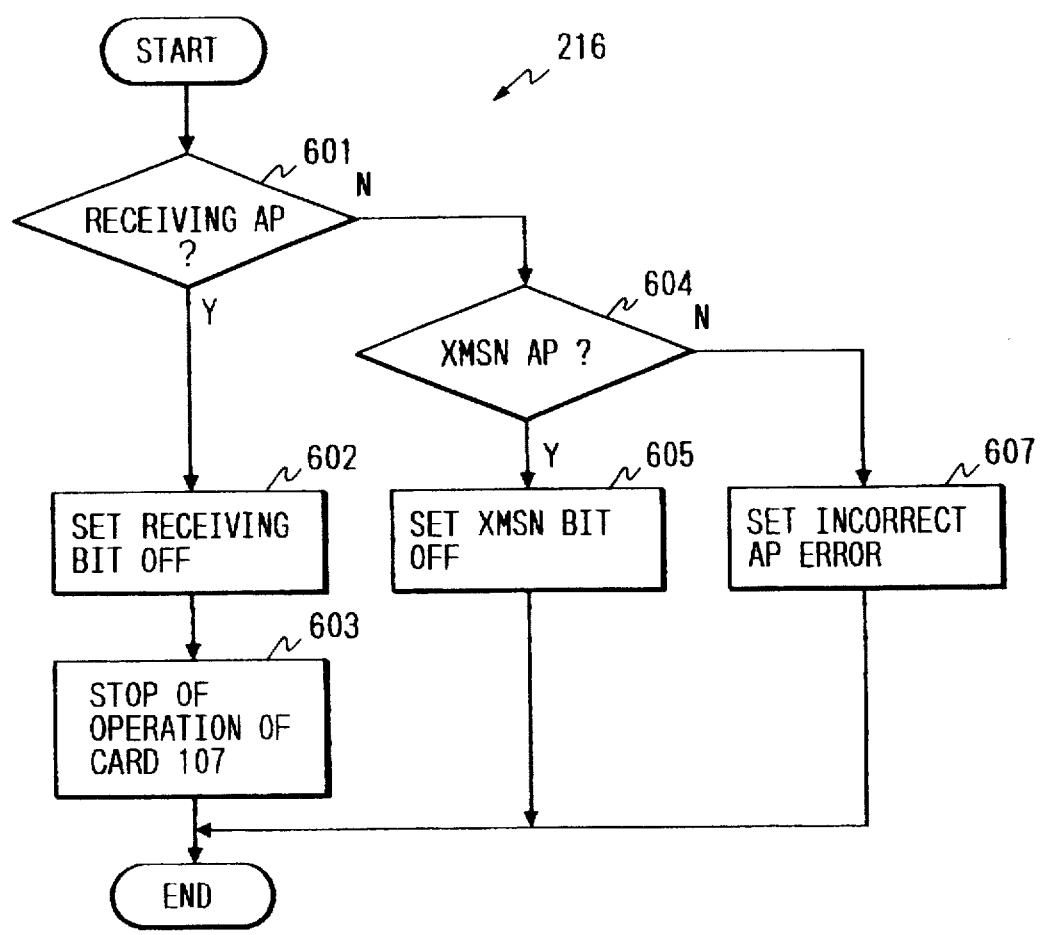
FIG. 6 shows a flow chart of this embodiment for showing the close processing shown in FIG. 2.
Figure 12:
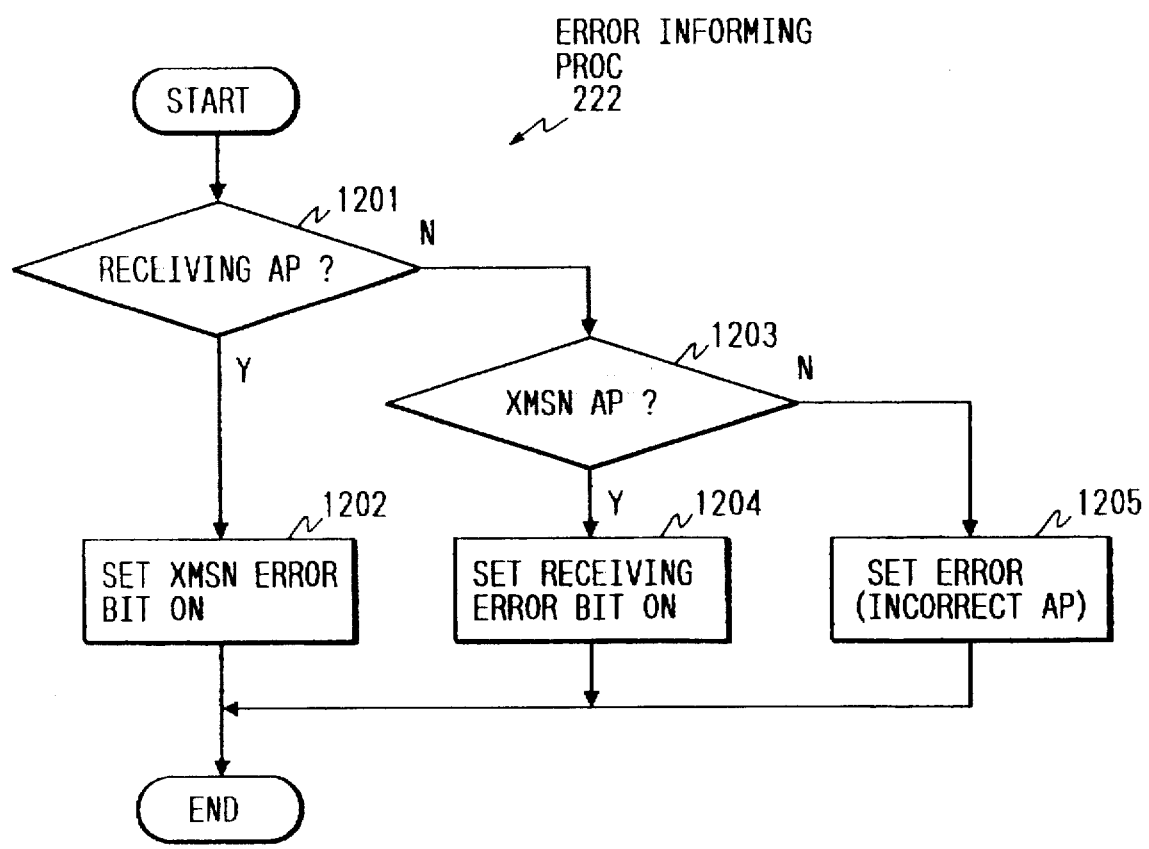
FIG. 12 shows a flow chart of this embodiment for showing the error informing processing shown in FIG. 2.
Figure 13:
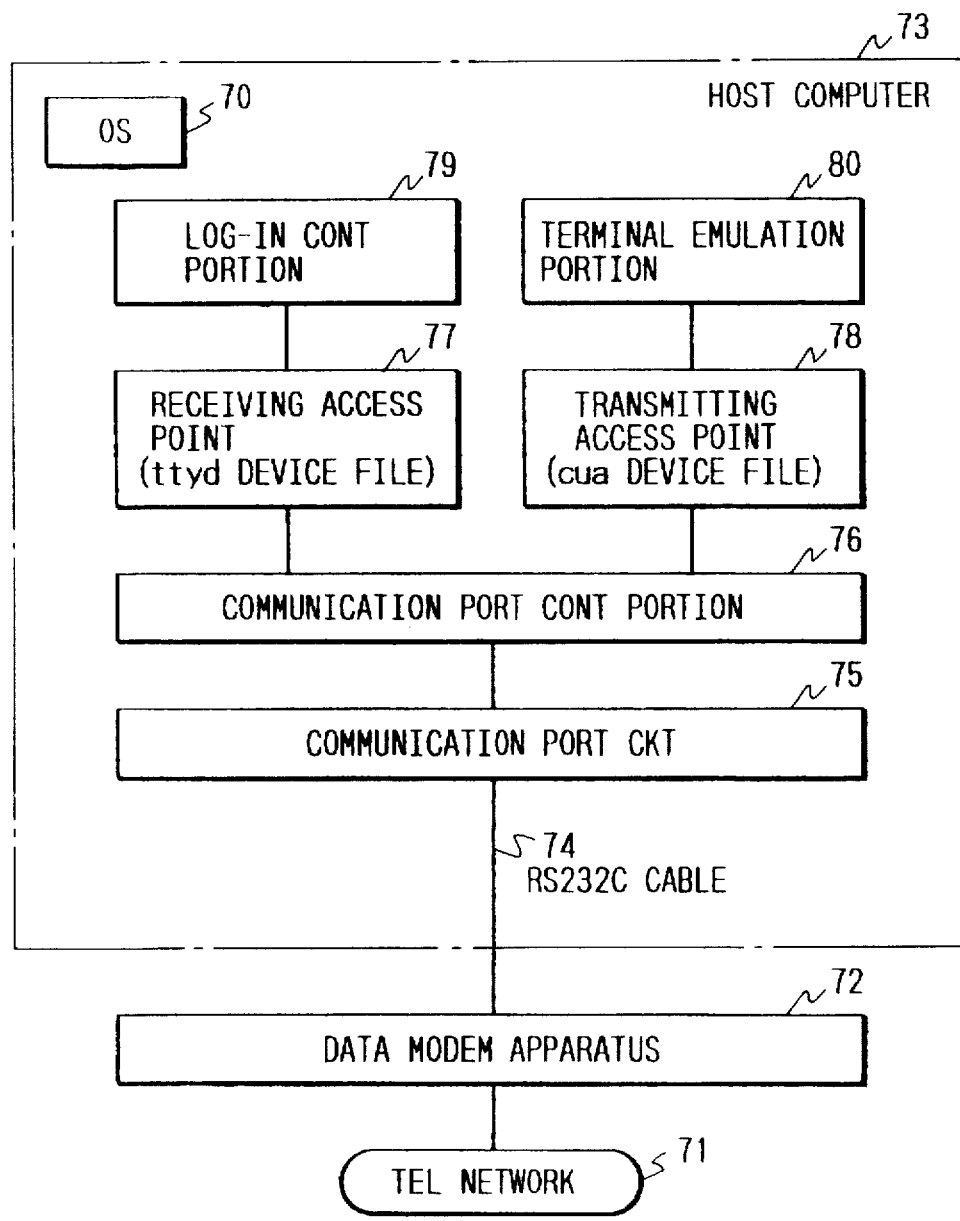
FIG. 13 is a block diagram of the prior art device control apparatus.
Figure 14:
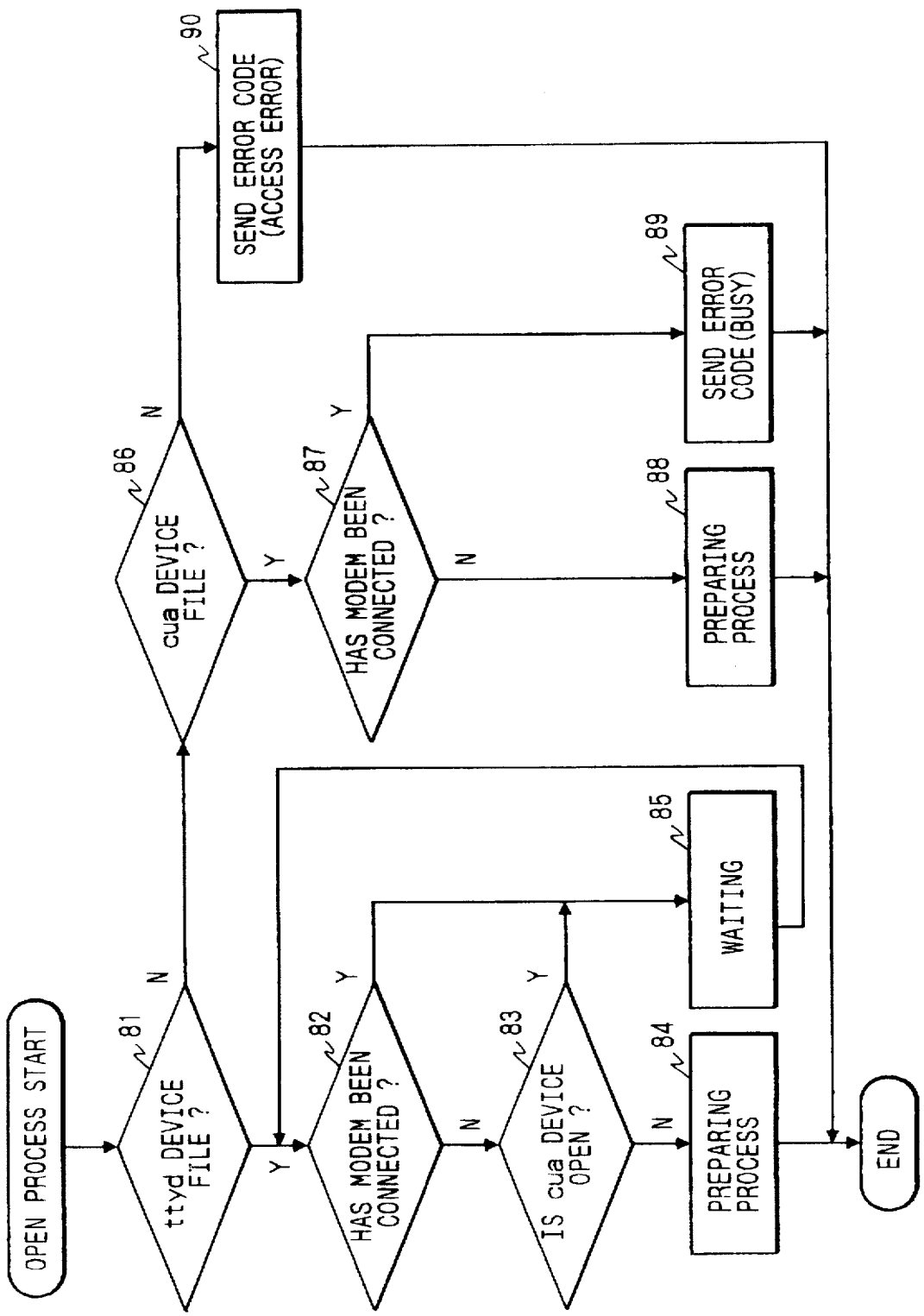
FIG. 14 shows a flow chart showing an operation of the prior art device control apparatus.

If the facsimile receiving control portion 201 fails in the execution of the initial setting, the error information command is executed because in step 310, the facsimile transmission control portion is informed of the error. This is executed by the input output control system call. The operation system of the host computer 101 calls the error informing process 222 with a parameter indicative of the type of the access point, FIG. 12 shows a flow chart of this embodiment for showing the error informing process 222 shown in FIG. 2. In the case of the error information process for the receiving access point, the transmission error bit is set on in steps 1201 and 1202. In the case of the error informing process for the transmission access point, the receiving error bit is set on in steps 1203 and 1204. Moreover, in step 311, a close system call is sent to the receiving access point to finish the controlling for the facsimile modem card 107. The operation system of the host computer 101 calls the close process with a parameter indicative of the type of the access point. FIG. 6 shows a flow chart of this embodiment for showing the close process 216 shown in FIG. 2. In step 601, the right of use is removed from the receiving access point. In step 603, the operation of the facsimile modem card 107 is stopped. The MPU 102 sets the stop bit of the command and status register 108 ON.

If the close process is for the transmission access point, the right of use is removed from the transmission access point in step 605 and processing ends. The reason why the facsimile modem card 107 is not stopped in the closing of the transmission access point is that it is assumed that the facsimile receiving control portion 201 always activated and the facsimile modem card 107 always operates.

Then, it is assumed that the facsimile receiving control portion 201 fails in the execution of the initial setting command and processing ends after execution of steps 310 and 312. Here, if the user starts up the facsimile control portion to transmit a video image, in step 401, an open system call is sent to the transmission access point. The operation system of the host 101 calls the open process 215 with a parameter of the type of the access point. In this case, the transmission error bit set on in step 1202 is detected by the step 504 for error checking, so that the IO error is set in the step 507 and the open system call ends with an error and the facsimile transmission control portion 202 ends with failure.

As mentioned above, the error detected one access point can be informed to the other access point by providing the error informing means to the facsimile modem control portion 205, so that a system call for the informed access point will be failed. Programs using the other access point can receive the error information without communication between processes, so that a more simple controlling is provided.

At last, a flow of the facsimile transmission control 202 will be described. In step 401, an open system call is sent to the transmission access point 204. As described in the open process shown in FIG. 5, if it is possible to obtain the right of use, the facsimile transmission process starts in step 403. If the right of use is in the receiving access point 203, a busy error occurs. Therefore, in step 408, processing waits for a given interval and then, the processing of step 401 is executed again. If the facsimile transmission is finished in step 404, a close system call is executed for the transmission access point to remove the right of use in step 605. In the facsimile transmission processing in step 403, the facsimile communication command, and video data are written, and the response to the facsimile communication command is read. If the transmission and the receiving occur at the same time, the receiving response is read out by the transmission control portion 202 having the right of use. At the instance, the facsimile transmission process 404 stops the execution and closes the transmission access point and releases the right of use. Then, if the receiving response is received from the facsimile modem card 107, the right of use is set to the receiving access point 203 as described with FIGS. 9A, 9B, and 10 and the facsimile receiving process is started in step 308. In step 405, a decision is made as to whether the cause of the termination of the facsimile transmission is due to the receiving. If YES, the processing is repeated from the step 401.

What is claimed is:

1. A device controlling apparatus comprising:
    (a) a plurality of access points, each controlling one of receiving and sending of data in response to receiving demand and sending demand signals;
    (b) an error detection means for detecting an error in the operation of at least one of said plurality of access points during said receiving and said sending of data; and
    (b) intercommunication means for intercommunicating among said plurality of access points in response to a command signal from said error detection means, wherein said error detection means informs other access points through said intercommunication means of said error detected by said error detection means using said command signal.

2. A device controlling apparatus as claimed in claim 1, wherein said data is received and sent by said plurality of access points through a telephone line.

3. A device controlling apparatus comprising:
    (a) a plurality of access points each controlling one of receiving and sending of data in response to a control signal;
    (b) priority setting means for setting a predetermined operating priority order to said plurality of access points in response to receiving demand and sending demand signals; and
    (c) control means responsive to said receiving demand and sending demand signals for producing said control signal based on said predetermined priority order;
    wherein an access point for controlling the receiving of data has a higher priority than an access point for controlling the transmission of data.

4. A device controlling apparatus as claimed in claim 3, wherein said data is received and sent by said plurality of access points through a telephone line.

* * * * *